United States Patent
Kota et al.

(10) Patent No.: US 8,789,122 B2
(45) Date of Patent: Jul. 22, 2014

(54) TV SEARCH

(75) Inventors: Kalyana Kota, San Diego, CA (US);
Utkarsh Pandya, San Diego, CA (US);
Ling Jun Wong, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 989 days.

(21) Appl. No.: 12/383,053

(22) Filed: Mar. 19, 2009

(65) Prior Publication Data
US 2010/0242077 A1    Sep. 23, 2010

(51) Int. Cl.
*H04N 7/025* (2006.01)
*H04N 7/08* (2006.01)
*H04N 5/445* (2011.01)
*H04N 7/173* (2011.01)

(52) U.S. Cl.
USPC ............................. 725/110; 725/40; 725/53

(58) Field of Classification Search
CPC .. H04N 21/482; H04N 21/472; H04N 21/478
USPC ............................................. 725/39–55, 110
See application file for complete search history.

(56) References Cited

U.S. PATENT DOCUMENTS

| | | | |
|---|---|---|---|
| 7,228,556 B2 | 6/2007 | Beach et al. | |
| 2002/0059608 A1 | 5/2002 | Turner | |
| 2003/0229900 A1* | 12/2003 | Reisman | 725/87 |
| 2005/0172318 A1* | 8/2005 | Dudkiewicz et al. | 725/46 |
| 2006/0101504 A1 | 5/2006 | Aravamudan et al. | |
| 2007/0118813 A1* | 5/2007 | Forstall et al. | 715/805 |
| 2007/0244902 A1 | 10/2007 | Seide et al. | |
| 2008/0086747 A1* | 4/2008 | Rasanen et al. | 725/46 |
| 2008/0092169 A1* | 4/2008 | Shannon et al. | 725/46 |
| 2009/0222757 A1* | 9/2009 | Gupta et al. | 715/776 |

OTHER PUBLICATIONS

"Text Editing in Digital Terrestrial Television: a comparison of three interfaces," A. Iatrino, S. Modeo, document undated but identified Oct. 10, 2008.
Google Desktop features, document printed Mar. 9, 2009.

* cited by examiner

*Primary Examiner* — Benjamin R Bruckart
*Assistant Examiner* — Jason Thomas
(74) *Attorney, Agent, or Firm* — Miller Patent Services; Jerry A. Miller

(57) ABSTRACT

A device consistent with certain embodiments has a television receiver and an Internet Protocol television (IPTV) receiver. A decoder decodes television programming from either of the television receiver or the IPTV receiver. A programmed processor(s) retrieves metadata relating to television programming, IPTV content, any installed Widgets, and the television (TV) receiver device's function, all of which are considered search targets. The programmed processor stores tags from the metadata in a database and associates the tags with their targets. A search engine searches the database for tags in response to a search query and to retrieve the associated target on command. The control processor executes the target by either tuning to the target's program content or by launching or resuming a Widget or TV device function. This abstract is not to be considered limiting, since other embodiments may deviate from the features described in this abstract.

24 Claims, 3 Drawing Sheets

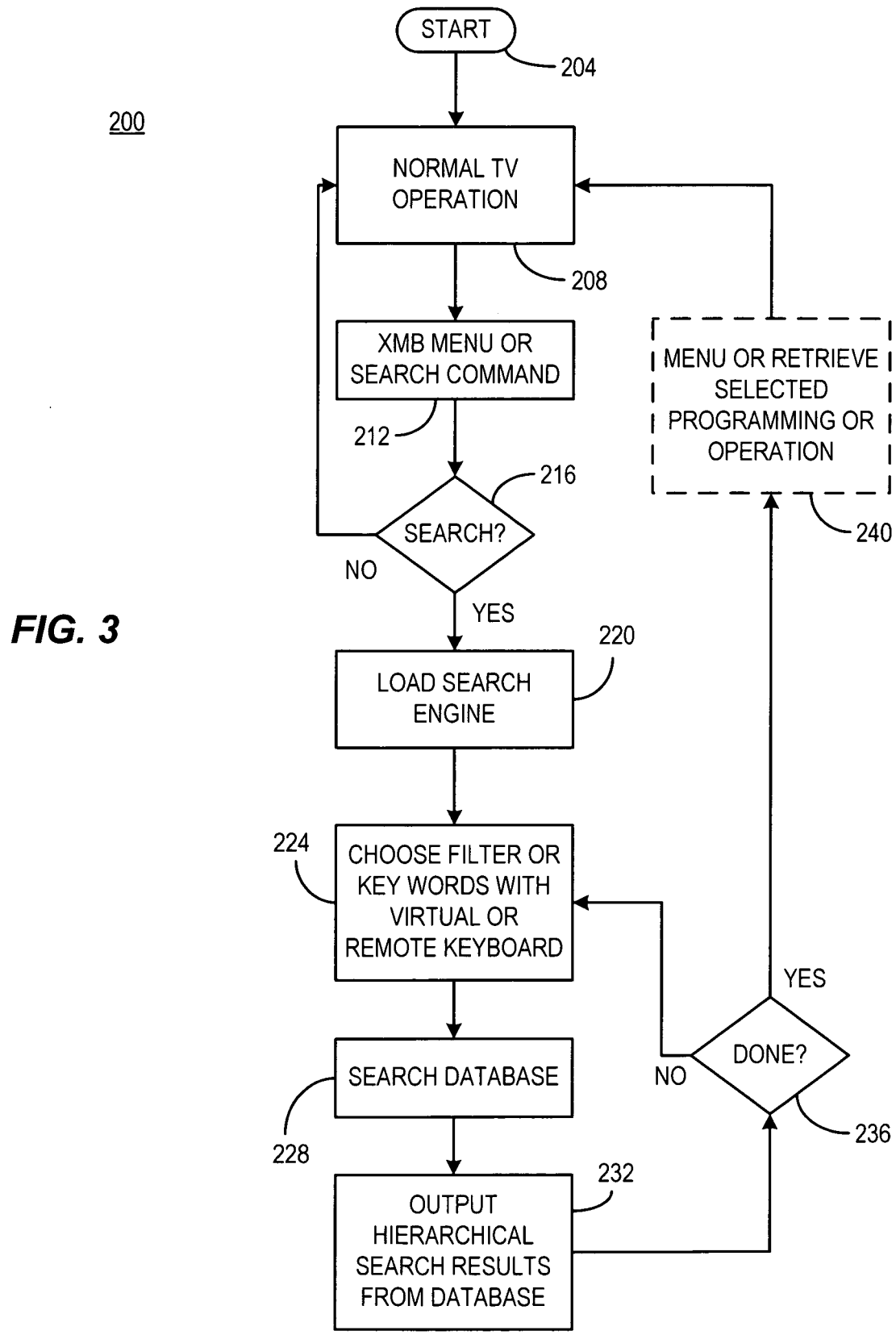

TV SEARCH

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

As modern TVs get more complicated, with increasing services and applications available to the user, and with the limited navigational capabilities of the remote control, it becomes increasingly hard to find the items the user is interested in. The number of conventional TV channel services available today already potentially occupies over 50 channels. To make matters worse, the user often has to search and guess where a particular setting might reside in the television's menu system. Additionally, when Internet Protocol Television (IPTV) is considered along with user applications such as "Widgets", the television set's operation is greatly complicated over the level of complexity of older conventional analog television sets.

Google desktop is a good example of a searching tool on a home computer. However, Google Desktop is a text-based search tool which looks for files, not applications or TV channels.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 3 is an example search process consistent with certain embodiments of the present invention.

DETAILED DESCRIPTION

Figure 1:
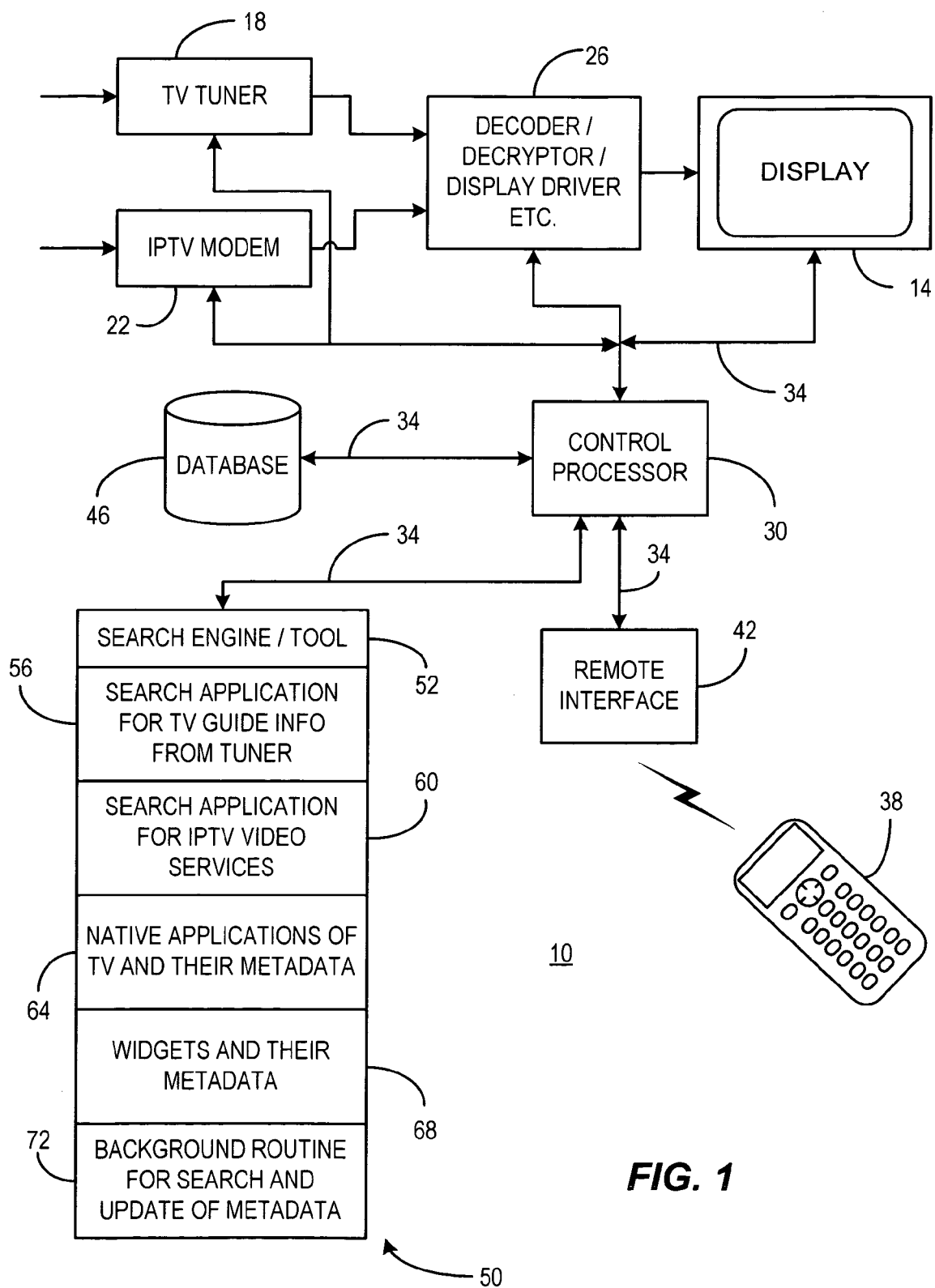
FIG. 1 is an example system block diagram for a television receiver device consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a module, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As noted above, there has been a rapid increase in complexity and programmable functionality of a television set. Added functionality of the television may be accomplished using a so-called "Widget". For purposes of this document, the term "Widget" is used to mean a lightweight software application that is designed to operate in a television receiver environment that is available to carry out various dedicated functions for the user. In the modern TV environment, such programs may interact with storage, the Internet, a cable or satellite system, other TV related software and hardware components responsible for the normal functioning of the TV through a specific interface, other Widgets on the TV or other entities to carry out various functions for the convenience of the user. The user can launch or terminate such Widgets by selecting them from a menu, through user input via a key on the TV's remote control, voice activation, gesture activation or the like, through an automatic contextual launch where the TV program deemed as appropriate or other interface in order to access or restrict their functionality in the television environment. The "Widget" may exist as a program independently on the system, or on a common Widget platform where global variables may affect the Widget in terms of functionality, operability, visibility or the like. The Widget operates as a computer program running on the TV's central processor or on another processor within the television.

Widgets can be used like a computer program by a TV viewer to implement functions that have not been available to the user the TV user in the past. For example, a Widget can be developed to provide access to email, play games, provide weather forecasts, provide clock functions, provide RSS feeds, display a photo album, or some other content that is being received via the web which displayed on the TV with the proper means, etc.

The present search enhancement feature is implemented within a television set (TV) and allows users to make a generic text-input search for an application and directly enter a particular channel/application/settings from any part of the TV. This includes not only searches of metadata associated with television programs, but also other data including data relating to system functions of the television, IPTV programming or content metadata, and metadata or other information relating to Widgets.

With reference to FIG. 1, a television set 10 is depicted in which a television display 14 displays content, menus and information as will be described. The television 10 potentially receives input from a variety of sources potentially including, but not limited to a conventional TV tuner (analog and/or digital) 18 or a modem or other Internet connection 22 serving as an IPTV receiver device that provides content to a decoder, decrypter, display drivers, etc. 26 in a more or less conventional manner to drive the display 14.

The TV functions under control of a programmed control processor 30 that communicates with the various TV components via one or more buses or control lines depicted as buses 34. Commands from a remote controller 38 are passed through a remote controller interface 42 in order to provide the user with control of the TV 10. TV 10 includes an internal database 46 which operates as a metadata database to store metadata relating to television programming. However, in addition, database 46 stores data relating not only to conventional television programming, but also to TV programming available over the Internet as well as metadata or other data associated with native TV operation and Widgets that are stored on and operational on the TV. To accomplish this, the TV processor has associated with it a memory or other storage device 50—which may be any suitable combination of volatile and nonvolatile memory including semiconductor, optical and mechanical technologies, etc. In certain embodiments, memory 50 is made entirely or predominantly of flash memory. Memory 50 may also encompass the database 46 which is shown separately for clarity. Among other things, the memory 50 may store the TV's operating system and operational programming used to carry out normal TV control functions. Such functional modules are not shown for clarity, but the memory 50 also stores a search engine (or a database management system) such as SQLite™ or other suitable search engine 52 as well as a search application for finding TV guide data 56 and a search application for finding IPTV video services 60. The native applications for the TV may also include key words and/or metadata shown as 64, and any widgets loaded onto the TV may also have associated key words and metadata shown as 68. Finally, the TV may incorporate a background routine 72 that is used to search for and update database information for new metadata.

By way of example, the user can use the remote controller 38 to bring up a search tool consistent with certain implementations and can search for "NBC", for example. The search module (search engine 52) then looks up all the TV modules, realizes that NBC is a TV network or channel, and returns all the relevant results of the search (there may be more than one NBC channel and NBC could also be available as a Widget or other hit in the search results). The user then selects the correct choice, the current screen terminates and the NBC channel shows up after necessary transitions are made.

The search engine and database reside on the TV and allows users to make a generic text-input search for an application and directly enter particular channel/application/settings from any part of the TV. This feature described in the application looks for applications, Widgets, TV channels or basically where things are, rather than particular content or media. Hence, the user can search not only for programming but for television or Widget functionality. Thus, in the example above, a search for "weather", the search engine might retrieve links to a weather Widget, The Weather Channel, and any programming with the term "weather" as either a key word or part of a title or part of the programming's metadata (e.g., local news programming that provides a weather forecast, or a movie having a foul weather related plot).

Operation of the system can also proceed, for example, according to the following scenario. Assume the user is navigating through any part of the TV, say, in the video guide of the Yahoo™ service. In certain implementations using a cross media bar menu system (XMB) such service may appear under the Internet Channel column of the menu. Now assume that the user wants to tune in to the CNN news from the Video Guide, but does not know the actual channel for CNN. The user brings up the Application/Channel search tool (for example via a direct entry to the tool provided on the remote control 38. The user then types in "CNN" into a search box provided on screen by the tool and requests the search by entering the "search" command (either directly from the remote control as a "Search", as an "Enter" command, or by selecting "Search" as a selectable icon on the TV screen). As a consequence, the search tool searches and returns the relevant results from the search, among which is the channel, showing CNN news. Other possible results may include other CNN related channels, an RSS feed hosted by CNN, or other programming for which the search engine retrieves a hit. The user can then select the channel to tune to CNN. In this instance, on selection, the video guide application will terminate its operations and return control to the TV, which then brings up the channel that is requested (CNN). The information for the TV response is provided by the search tool, which possess the correlation between the actual channel on the TV and the searched keyword "CNN". In this way, the TV does not have to interpret a random keyword to look for the application, but instead, it only has to recognize a fixed application ID which represents that channel/application and which is registered by the TV on boot up, on a routine update, or when a channel or Widget is added, deleted or refreshed (which will be elaborated further below). The randomness is already handled by the search tool which will provide the corresponding Application ID already registered in the database.

The search tool operates to gather, and put into the database 46 the necessary information (tags) from the TV, such as related keywords for the settings, available Widgets, available services in the Internet Channel, services and metadata from the TV guide, as well as other non-limiting applications/channel types. Periodically or on demand, this database can be updated, especially, the Internet services and the TV channel metadata since programs provided by TV and Internet channels are ever-changing. However, variation in the update cycle for each of the different sources of data is contemplated in other implementations. Moreover, data can be pushed to the TV 10 by approved services (e.g., an approved Internet site) as well as pulled by the TV on a periodic or demand basis.

When the search tool is called and a keyword is entered, the search tool will look through this database for the matching tags. If a successful tag is found, it is matched to the corresponding application ID. Indexing may be used to enhance the search, or other known search enhancements can be provided. All successful search results will be returned and presented on a user's display. The user can select a result and the corresponding Application ID is passed to the TV, which then performs the necessary actions. Such actions can include launching an associated TV or IPTV program, changing channel or launching a selected Widget. In this way, the user does not have to scroll through tons of applications/channels in search of a particular application/channel. This allows users to make a generic text-input search for an application and enter directly particular channel/applications from any part of the TV.

In operation of embodiments consistent with the present invention, metadata tags can not only be associated with programming from conventional TV and IPTV, but can also be associated with TV functions (e.g., menus or tuning operations) as well as Widgets that carry out various functions.

While one processor is depicted in FIG. 1, one or more programmed processors can have one or more program modules that retrieves metadata relating to television programming, metadata relating to IPTV content, metadata relating to any installed Widgets, and metadata associated with the television (TV) receiver device's function. For convenience, the television programming, the channel selection, the IPTV content, the Widgets and the TV receiver device functions can all be considered search targets. The programmed processor stores tags from the metadata in a database to associate the tags with their targets. The search engine, that runs on the one or more programmed processors or processor cores, searches the database for tags in response to a search query and to retrieves the associated target when the user selects the target and executes a suitable selection command. The control processor or processors execute the target by either tuning to the target's program content (e.g., by selecting a channel, or by launching or resuming a Widget or TV device function).

Figure 2:
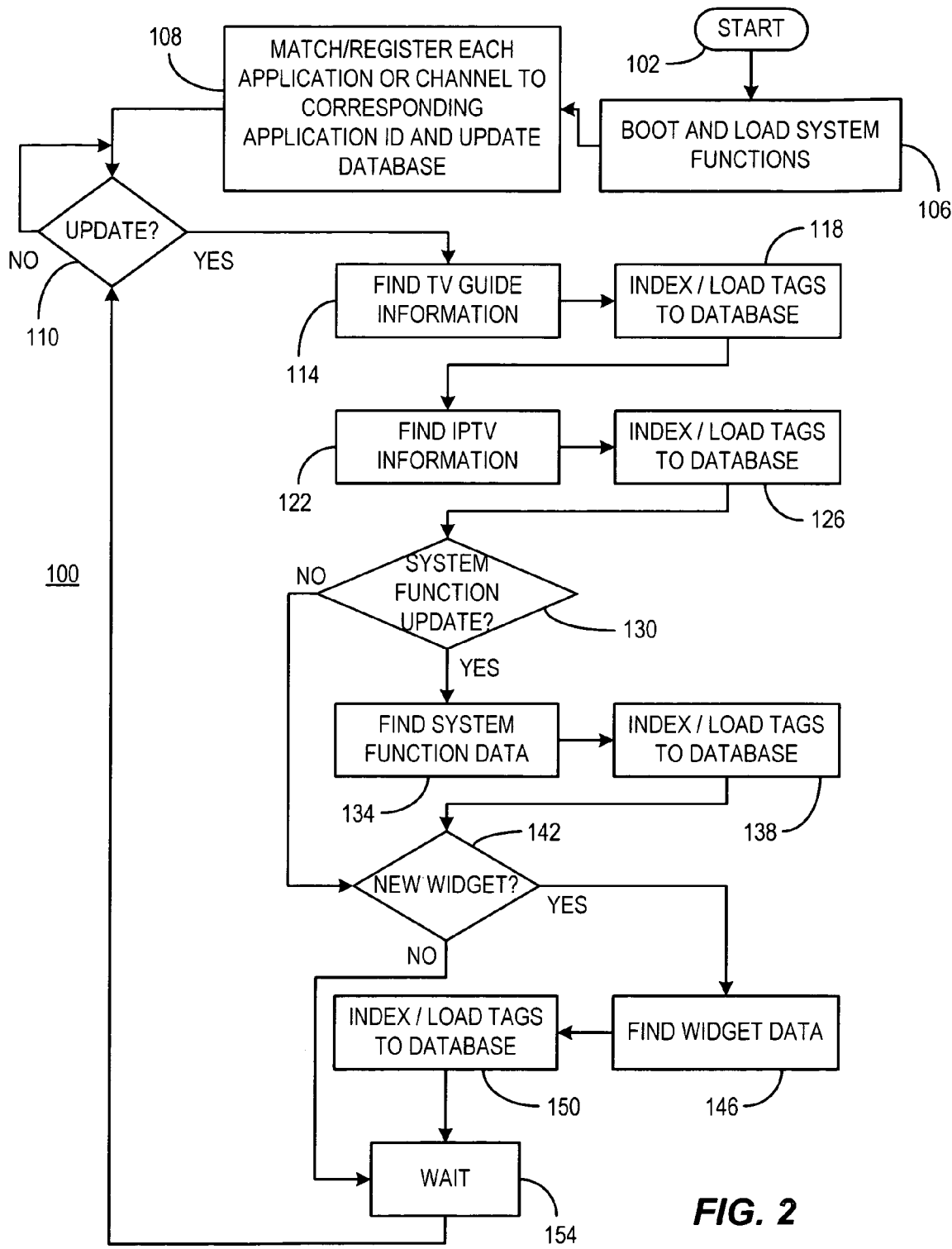
FIG. 2 is a flow chart depicting an example process for updating the database in a manner consistent with certain embodiments of the present invention.

Turning now to FIG. 2, one example process 100 is depicted for a background routine forming a part of the system's operation is carried out. Many variations are possible with this system, which depicts all updates being carried out on a periodic basis. For example, certain updates can be carried out with greater frequency than others, and some only need be carried out upon a particular action (e.g., loading a new Widget or obtaining an update of the System functions via a download, etc.). In this implementation, starting at 102, the system is powered up, boots and loads applicable system functions for the current turn-on state at 106. At 108, the TV processor(s) matches and registers into the database each application or channel and the corresponding Application ID for future reference, if the TV has been previously updated. The Application ID may be generated on the fly when the TV boots up and gets the entire list of applications and channels. Then the Application IDs are added to the database. The application IDs may not already be present in the database if they are not already known in advance, and the TV may not know how many and what applications and channels are available in advance4. If an update is to take place (which may happen at each power up, or at a designated time, etc.) at 110, in this example, control passes to 114 where TV guide information is found and downloaded (e.g., from an Internet site or via request of a service provider). It will be understood that such information may be pushed at a separate time in addition to or instead of as a periodic request as in 114. Once the TV guide information is identified and retrieved (or simultaneously therewith), it is possibly indexed and the tags from any metadata found are stored in database 46 at 118 to enable the user to locate by search either channels or programming content via a search as will be described later.

A similar operation takes place at 122 wherein IPTV content metadata and access information (i.e., links in the form of URLs or other links) is retrieved from either a plurality of sources of content or from an information aggregator such as is used in the Sony BIVL™ (Bravia™ Internet Video Link) system. Once that information is retrieved (or while it is being retrieved) the metadata tags are indexed and stored in the database 46 at 126 to enable to the user to locate by search the available content for streaming using IPTV technology.

Control then passes to 130 in this example implementation where optionally the processor(s) can determine if a system function update has occurred since the metadata associated therewith has been downloaded and stored in the database 46. If not, the function of downloading and storing new information can be bypassed to save resources. Otherwise, the system function data or metadata can be identified at 134 and downloaded for indexing and loading of associated tags into the database 46 at 138. In this manner, for example, if a firmware update is installed (by either a push or pull operation), any new features or improved metadata can be downloaded and stored to enable the user to take advantage of the search tool to find out information and access the TVs functionality. For example, the user could search for "move PIP" as key words to learn how to move a picture in picture window about the screen; or, could search for "Widget download" to learn how to download and install a Widget on the TV system; or, could search "XMB" to find tags related to cross media bar functions, and even bypass the menu system to get to a particular function.

In this implementation, control passes from 138 (or 130) to 142 where a determination can be made as to whether a new Widget has been installed or updated. If not, control passes to 154 to await the next update cycle beginning by returning to 110. If so, the processor searches for metadata or data related to one or more Widget programs installed on the TV (or available for installation) at 146 and loads appropriate tags to the database 46 at 150. Those tags are loaded into the database, possibly with appropriate indexing to speed searching at 150 and control passes to 154.

Hence, in accord with the above description, not only TV programming and IPTV content are available from the program guide; they can be found via a keyword or filtered search using the search engine. Moreover, the search tool can be used to search for other resources including, but not limited to, programmed functions available in the television set itself as well as Widgets that are installed or available on the TV set. As such, a search of "San Francisco" may result in, among other things, Widgets that provide traffic, news or weather information for the San Francisco area; or, may produce a movie or television program relating to San Francisco available through conventional TV or IPTV.

The search process can be carried out using, for example, a process 200 similar to that of FIG. 3, starting at 204 and assuming that the TV is in a mode of normal TV operation at 208. The user can issue a command either directly by the remote control or by access through a menu system such as a cross media bar menu system at 212 to initiate a search. When such a search is initiated at 216, the search tool's search engine is loaded at 220 at which point the user is presented with a display that includes any suitable search paradigm.

This can include check boxes for search categories and search filters, and a keyword entry box. The user then chooses filters and/or key words at 224 by use of a virtual keyboard on the display and using the remote controller to navigate to generate the key words, or by direct entry from a keypad or keyboard. When the search criteria have been established at 228, the search is initiated by a search command issued from the remote control either directly or via a virtual button on the display to which the remote control navigates. The search engine then carries out the search and produces a displayed output—preferably, but not necessarily, in a hierarchical order of likelihood at 232. If the search is to be refined, or another search carried out at 236, control returns to 224 and the search screen can be edited or started anew. If the search is completed at 236, control passes to 240 where any number of actions can take place based upon the user's input. For example, if the user selects a channel or a program or other content, the TV changes channels or loads the content. If the user simply exits, control can return to normal TV operation at 208, or if the user entered the search tool via a menu, the control may return to the menu system. Other variants will occur to those skilled in the art upon consideration of the present teachings.

In another implementation, where a network is available, the search enquiry can also be posted to a specialized server (eg, a server hosted by a TV manufacturer such as Sony Corp. or a service provider) to include demographics not available to a local system, such as the most watched TV channel at the current time and location or the most popular widget currently being used. Special and unique information about a particular TV such as the TV serial number, model number or a combination of both, can be transmitted to the server as a means to unique identification. This will allow the server to know exactly what applications (system function or widgets) and channels (TV or internet) are available to that particular TV, and hence conduct a search based on this list and return the most relevant results. The server's database is updated whenever the TV registers for a new widget or a new channel.

Thus, according to certain implementations, a television receiver device has a television receiver and an Internet Protocol television (IPTV) receiver. A decoder decodes television programming from either of the television receiver or the IPTV receiver. One or more programmed processors have one or more program modules that retrieve metadata relating to television programming, metadata relating to IPTV content, metadata relating to any installed Widgets, and metadata associated with the television (TV) receiver device's function. The television programming, the IPTV content, the Widgets and the TV receiver device functions are considered search targets. The programmed processor stores tags from the metadata in a database and associates the tags with their targets. A search engine runs as a functional module on the one or more programmed processors to search the database for tags in response to a search query and to retrieve the associated target on command. The control processor executes the target by either tuning to the target's program content or by launching or resuming a Widget or TV device function.

In certain example embodiments, the search engine presents potential targets for selection by a user prior to execution of the target. In certain example embodiments, the selection by the user comprises selecting one of a plurality of search results. In certain example embodiments, the tags are indexed in the database. In certain example embodiments, IPTV tags are associated with Universal Resource Locator links in the database. In certain example embodiments, the Widget tags are associated with a command to launch the associated Widget. In certain example embodiments, the processor retrieves or updates all metadata on a periodic basis. In certain example embodiments, the processor retrieves or updates metadata on a periodic basis, with a different period for metadata associated with at least two of the types of targets. In certain example embodiments, at least a portion of the metadata are pushed to the television receiver device by a source on the Internet. In certain example embodiments, the TV system function metadata are retrieved only when there is an update of the metadata. In certain example embodiments, the Widget metadata are retrieved only for Widgets loaded into the TV receiver device. In certain example embodiments, the Widget metadata are retrieved for Widgets available for loading into the TV receiver device. In certain example embodiments, the database and program modules are stored on flash memory.

In another example embodiment, a television receiver device, has a television receiver and an Internet Protocol television (IPTV) receiver. A decoder decodes television programming from either of the television receiver or the IPTV receiver. One or more programmed processors have one or more program modules stored on a flash memory that retrieves metadata relating to television programming, metadata relating to IPTV content, metadata relating to any installed Widgets, and metadata associated with the television (TV) receiver device's function. The television programming, the IPTV content, the Widgets and the TV receiver device functions are considered search targets. The programmed processor stores tags from said metadata in a database and associates the tags with their targets. A search engine runs as a functional module on the one or more programmed processors to search the database for tags in response to a search query and to retrieve associated targets as a result of the search command. The control processor executes a user selected target selected from among search results by either tuning to the target's program content or by launching or resuming a Widget or TV device function.

In certain example embodiments, the tags are indexed in the database. In certain example embodiments, IPTV tags are associated with Universal Resource Locator links in the database, and where the Widget tags are associated with a command to launch the associated Widget. In certain example embodiments, the processor retrieves or updates all metadata on a periodic basis. In certain example embodiments, the processor retrieves or updates metadata on a periodic basis, with a different period for metadata associated with at least two of the types of targets. In certain example embodiments, the TV system function metadata are retrieved only when there is an update of the metadata. In certain example embodiments, the Widget metadata are retrieved only for Widgets loaded into the TV receiver device. In certain example embodiments, the Widget metadata are retrieved for Widgets available for loading into the TV receiver device.

In certain other example embodiments, a television receiver device has a television receiver and an Internet Protocol television (IPTV) receiver. A decoder decodes television programming from either of the television receiver or the IPTV receiver. One or more programmed processors having one or more program modules stored on a flash memory that retrieves metadata relating to television programming, metadata relating to IPTV content, metadata relating to any installed Widgets, and metadata associated with the television (TV) receiver device's function. The television programming, the IPTV content, the Widgets and the TV receiver device functions are considered search targets. The programmed processor indexes and stores tags from said metadata in a database and associates the tags with their targets, where IPTV tags are associated with Universal Resource Locator links in the database, and where the Widget tags are associated with a command to launch the associated Widget. A search engine runs as a functional module on the one or more programmed processors to search the database for tags in response to a search query and to retrieve associated targets as a result of the search command. The control processor executes a user selected target selected from among search results by either tuning to the target's program content or by launching or resuming a Widget or TV device function. The processor retrieves or updates all metadata on a periodic basis, and the Widget metadata are retrieved only for Widgets loaded into the TV receiver device.

Those skilled in the art will recognize, upon consideration of the above teachings, that certain of the above exemplary embodiments are based upon use of a programmed processor using program modules that carry out the various functions. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using one or more programmed processors executing programming instructions that are broadly described above in flow chart form that can be stored on any suitable electronic computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A television receiver device, comprising:
    a television receiver;
    an Internet Protocol television (IPTV) receiver;
    a decoder that receives television programming from the television receiver and the IPTV receiver and where the decoder decodes television programming from a selected one of the television receiver and IPTV receiver;
    one or more programmed processors having one or more program modules that retrieves metadata relating to television programming, metadata relating to IPTV content, metadata relating to any installed Widgets, and metadata associated with the television (TV) receiver device's functions;
    the television programming, the IPTV content, the Widgets and the TV receiver device's functions comprising targets, where the processor retrieves or updates metadata on a periodic basis, with a different period for metadata associated with at least two types of the targets;
    the programmed processor storing tags from said metadata in a database and associating the tags with their targets;
    a search engine that runs as a functional module on the one or more programmed processors to search the database for tags in response to a search query and to retrieve the associated target on command, and where the search engine presents potential targets for selection by a user prior to execution of the target; and
    the control processor executing the target, where executing the target is carried out by tuning to television program content when the target is a television program, by playing IPTV program content when the target is IPTV content, by launching or resuming a Widget when the target is a Widget, and by launching or resuming a TV receiver device's function when the target is a TV receiver device's function.

2. The device according to claim 1, where the selection by the user comprises selecting one of a plurality of search results.

3. The device according to claim 1, where the tags are indexed in the database.

4. The device according to claim 1, where IPTV tags are associated with Universal Resource Locator links in the database.

5. The device according to claim 1, where the Widget tags are associated with a command to launch the associated Widget.

6. The device according to claim 1, where the processor retrieves or updates all metadata on a periodic basis.

7. The device according to claim 1, where at least a portion of the metadata are pushed to the television receiver device by a source on the Internet.

8. The device according to claim 1, where the TV system function metadata are retrieved only when there is an update of the metadata.

9. The device according to claim 1, where the Widget metadata are retrieved only for Widgets loaded into the TV receiver device.

10. The device according to claim 1, where the Widget metadata are retrieved for Widgets available for loading into the TV receiver device.

11. The device according to claim 1, where the database and program modules are stored on flash memory.

12. A television receiver device, comprising:
    a television receiver;
    an Internet Protocol television (IPTV) receiver;
    a decoder that receives television programming from both the television receiver and the IPTV receiver and where the decoder decodes television programming from a selected one of the television receiver and IPTV receiver;
    one or more programmed processors having one or more program modules stored on a flash memory that retrieves metadata relating to television programming, metadata relating to IPTV content, metadata relating to any installed Widgets, and metadata associated with the television (TV) receiver device's functions;

the television programming, the IPTV content, the Widgets and the TV receiver device's functions comprising targets, where the processor retrieves or updates metadata on a periodic basis, with a different period for metadata associated with at least two types of the targets;

the programmed processor storing tags from said metadata in a database and associates the tags with their targets;

a search engine that runs as a functional module on the one or more programmed processors to search the database for tags in response to a search query and to retrieve associated targets as a result of the search command, and where the search engine presents potential targets for selection by a user prior to execution of the target; and the control processor executing a user selected target selected from among search results, where executing the target is carried out by tuning to television program content when the target is a television program, by playing IPTV program content when the target is IPTV content, by launching or resuming a Widget when the target is a Widget, and by launching or resuming a TV receiver device's function when the target is a TV receiver device's function.

13. The device according to claim 12, where the tags are indexed in the database.

14. The device according to claim 12, where IPTV tags are associated with Universal Resource Locator links in the database, and where the Widget tags are associated with a command to launch the associated Widget.

15. The device according to claim 12, where the processor retrieves or updates all metadata on a periodic basis.

16. The device according to claim 12, where the TV system function metadata are retrieved only when there is an update of the metadata.

17. The device according to claim 12, where the Widget metadata are retrieved only for Widgets loaded into the TV receiver device.

18. The device according to claim 12, where the Widget metadata are retrieved for Widgets available for loading into the TV receiver device.

19. A television receiver device, comprising:
a television receiver;
an Internet Protocol television (IPTV) receiver;
a decoder that receives television programming from both the television receiver and the IPTV receiver and where the decoder decodes television programming from a selected one of the television receiver and IPTV receiver;
one or more programmed processors having one or more program modules stored on a flash memory that retrieves metadata relating to television programming, metadata relating to IPTV content, metadata relating to any installed Widgets, and metadata associated with the television (TV) receiver device's functions;
the television programming, the IPTV content, the Widgets and the TV receiver device's functions comprising targets, where the processor retrieves or updates metadata on a periodic basis, with a different period for metadata associated with at least two types of the targets;
the programmed processor indexing and storing tags from said metadata in a database and associates the tags with their targets, where IPTV tags are associated with Universal Resource Locator links in the database, and where the Widget tags are associated with a command to launch the associated Widget;
a search engine that runs as a functional module on the one or more programmed processors to search the database for tags in response to a search query and to retrieve associated targets as a result of the search command, and where the search engine presents potential targets for selection by a user prior to execution of the target;
the control processor executing a user selected target selected from among search results, where executing the target is carried out by tuning to television program content when the target is a television program, by playing IPTV program content when the target is IPTV content, by launching or resuming a Widget when the target is a Widget, and by launching or resuming a TV receiver device's function when the target is a TV receiver device's function; and
where the processor retrieves or updates all metadata on a periodic basis, and where the Widget metadata are retrieved only for Widgets loaded into the TV receiver device.

20. A television receiver device, comprising:
a television receiver;
an Internet Protocol television (IPTV) receiver;
a decoder that receives television programming from both the television receiver and the IPTV receiver, and where the decoder is for decoding television programming from a selected one of the television receiver and IPTV receiver;
one or more programmed processors having one or more program modules that are programmed to retrieve metadata relating to television programming, metadata relating to IPTV content, metadata relating to any installed Widgets, and metadata associated with the television (TV) receiver device's functions;
the television programming, the IPTV content, the Widgets and the TV receiver device's functions comprising targets, where the processor retrieves or updates metadata on a periodic basis, with a different period for metadata associated with at least two types of the targets;
the programmed processor being configured to store tags from said metadata in a database and associate the tags with their targets;
a search engine that is configured to run as a functional module on the one or more programmed processors to search the database for tags in response to a search query and to retrieve the associated target on command, and where the search engine presents potential targets for selection by a user prior to execution of the target; and
the control processor being configured to execute the target by:
tuning to the target's program content for a television program when the target is a television program or IPTV content,
launching or resuming a Widget when the target is a Widget, and
executing a TV receiver device's function when the target is a TV receiver device's function.

21. The device according to claim 20, where the tags are indexed in the database.

22. The device according to claim 20, where IPTV tags are associated with Universal Resource Locator links in the database.

23. The device according to claim 20, where the Widget tags are associated with a command to launch the associated Widget.

24. The device according to claim 20, where the processor is programmed to retrieve or update all metadata on a periodic basis.

* * * * *